United States Patent
Breuder et al.

(10) Patent No.: US 6,434,677 B1
(45) Date of Patent: Aug. 13, 2002

(54) METHOD AND APPARATUS FOR ALTERING DATA LENGTH TO ZERO TO MAINTAIN CACHE COHERENCY

(75) Inventors: Paul D. Breuder, Hillsboro; Derek T. Bachand, Portland; David Lawrence Hill, Cornelius; Chinna Prudvi, Portland, all of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/323,360

(22) Filed: Jun. 1, 1999

(51) Int. Cl.[7] ............................................. G06F 12/00
(52) U.S. Cl. .................... 711/156; 711/158; 711/143; 711/144; 711/146; 711/108; 711/128
(58) Field of Search ................................. 711/141, 108, 711/156, 140, 143, 144, 145, 146, 150, 151, 152, 158, 163, 128

(56) References Cited

U.S. PATENT DOCUMENTS 5,623,628 A * 4/1997 Brayton et al. ............. 711/141
5,737,759 A * 4/1998 Merchant ..................... 711/146
5,905,876 A * 5/1999 Pawlowski et al. .......... 711/117
6,145,062 A * 11/2000 Chittor et al. ................ 710/52

* cited by examiner

Primary Examiner—Matthew Kim
Assistant Examiner—Matthew D. Anderson
(74) Attorney, Agent, or Firm—Kenyon & Kenyon

(57) ABSTRACT

Increased efficiency in a multiple agent system is provided by allowing all explicit writebacks to continue during a snoop phase. Upon each incoming external bus request, an agent determines if the address of that request matches an address of data within the agent. If there is a match, the agent copies this most recent data, changes the state of the data to unmodified, changes the length of the data to zero (for pending explicit writebacks), and performs an implicit writeback. Additionally, prior to each explicit writeback, an agent determines if the address of the explicit writeback and any incoming snoop request requests are the same. If there is a match, the agent changes the data length of the explicit writeback to zero prior to issuing the explicit writeback.

15 Claims, 5 Drawing Sheets

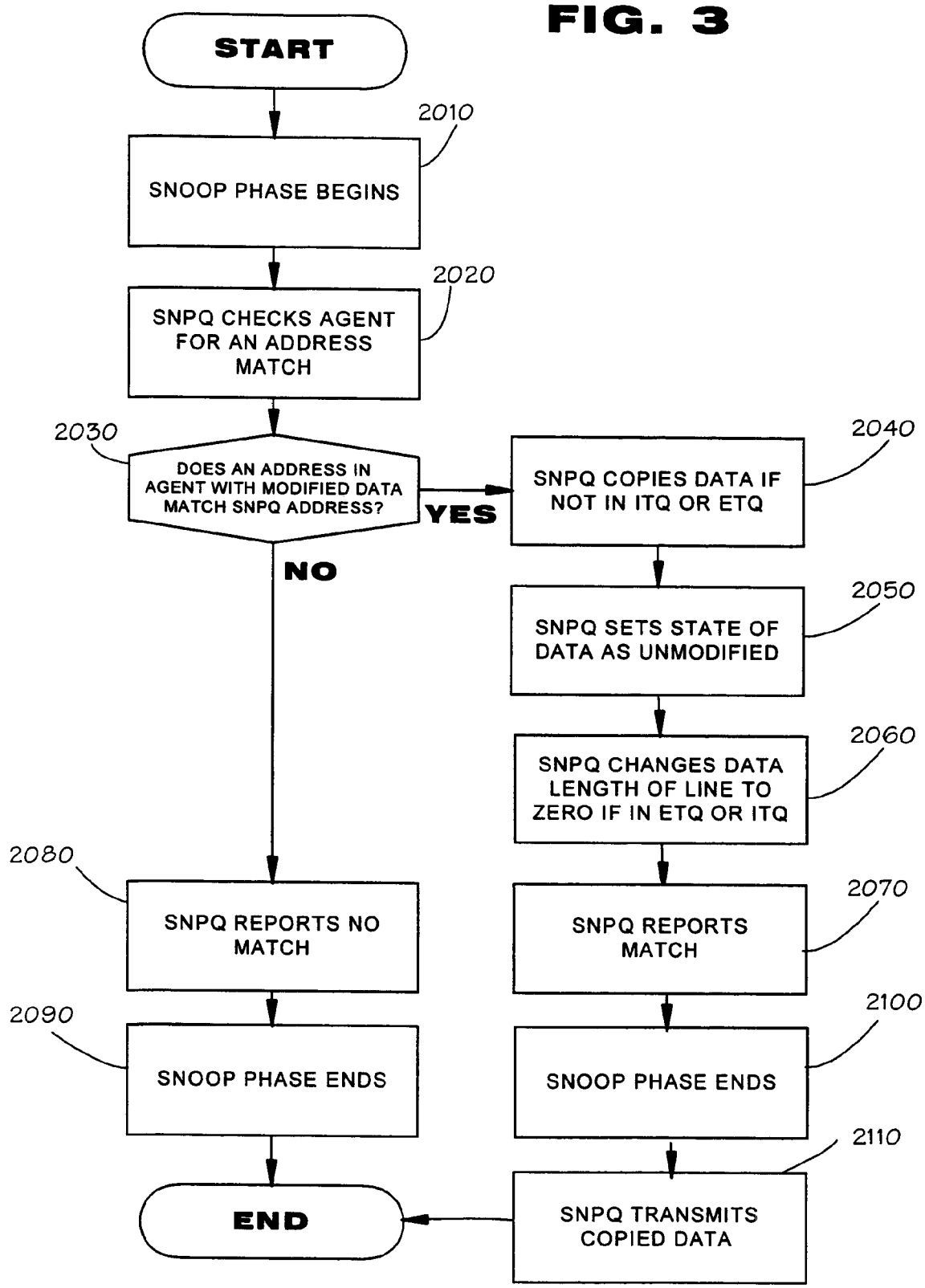

METHOD AND APPARATUS FOR ALTERING DATA LENGTH TO ZERO TO MAINTAIN CACHE COHERENCY

BACKGROUND

The present invention relates to an apparatus and method for an improved system of cache coherency in a multiple agent system.

In the electronic arts, a processing system may include a plurality of agents that perform coordinated computing tasks. The agents often share one or more main memory units designed to store addressable data for the use of all agents. The agents communicate with the main memory unit and each other over a communications bus during bus transactions. A typical system is shown in FIG. 1. FIG. 1 illustrates a plurality of N agents 10, 20, 30, 40 in communication with each other over an external communications bus 50. Data is exchanged among the agents 10, 20, 30 and the main memory unit 40 in a bus transaction. "Agents" include processors, memory units, and devices that may communicate over the communications bus 50.

In order to improve performance, an agent may include a plurality of tiered internal caches that store and alter data on a temporary basis. In such multiple agent systems, several agents may operate on data from a single address at the same time. Multiple copies of data from a single memory address may be stored in multiple agents. Oftentimes when a first agent must operate on data at an address, a second agent may store a copy of the data that is more current in its internal cache than the copy resident in the main memory unit 40. In order to maintain "cache coherency," the first agent should read the data from the second agent rather than from the main memory unit 40. Without a means to coordinate among agents, an agent may perform a data operation on a copy of data that is stale.

Along with each unit of data, an internal cache may store additional information, which may include the data's address in the main memory unit 40, the length of the data unit, and/or an indicator as to whether the data has been modified by the agent since being retrieved from main memory. This indicator—known as the "state" of the data—may reflect that the data has been modified or unmodified since being retrieved from main memory. Each agent may include cache coherency circuitry that ensures that data in a modified state is eventually returned to the main memory unit 40 via the communications bus 50.

In some agents, modified data may be returned to main memory as part of an "explicit writeback" transaction or as part of an "implicit writeback." In an explicit writeback, an agent generates a bus transaction to write the modified data to external memory in order to make room in the cache for newly requested data. That is, the agent (e.g., 10 in FIG. 1) acquires ownership of the communications bus 50 and drives the modified data on the communications bus 50. The external memory (e.g., agent 40 in FIG. 1) retrieves the data from the communications bus 50 and stores it according to conventional techniques.

By contrast, an implicit writeback typically occurs as part of a transaction initiated by another agent. Consider an example where agent 10 stores a copy of data in modified state; the copy in agent 10 is more current than a copy stored in the main memory unit 40. If another agent 20 posts a request on the communications bus 50 and requests the data, an implicit writeback would cause agent 10 to provide the requested data to agent 20 rather than the main memory unit 40.

In an implicit writeback, when agent 20 posts the request each of the other non-requesting agents performs an internal check to determine whether it possesses a modified copy of the data at the requested address in its internal cache system. If a non-requesting agent (agent 10 in the example) does have a modified of the requested data in its internal cache system it so indicates in a cache coherency signal of the transaction. The agent 10 drives the modified data on the external communications bus 50. The requesting agent 20 and the main memory unit 40 may read the data from the communications bus 50.

In almost all circumstances, explicit writebacks and implicit writebacks can proceed concurrently in a multiple agent system without violating cache coherency. Because explicit writebacks and implicit writebacks are not acted upon immediately, but are often placed in a pipeline of operations to be performed at a later time by an agent or a communications bus, a problem in cache coherency can occur in the boundary condition when an agent initiates an implicit writeback for data at a particular address while the agent is in the process of performing an explicit writeback of data from the same address. In this situation, it is possible for the agent to report newly updated data to the main memory unit via the implicit writeback before agent processes the external writeback for the same address. Cache coherency would be violated when the agent then processes the explicit writeback, because the explicit writeback will update memory with a copy of data from a particular address that is not the most current copy.

In the prior art, the solution to this problem was to temporarily halt all explicit writebacks during the time an implicit writeback was being processed. This suspension of all explicit writebacks resulted in a substantial performance loss, given that the probability that an implicit writeback and an explicit writeback involved data from the same address, and thus that cache coherency would actually be compromised, was quite small.

Accordingly, there is a need in the art for a system and method that allows the performance of explicit writebacks to continue during the processing of implicit writebacks while still maintaining cache coherency during the boundary condition where an agent initiates an implicit writeback for data at a particular address while the agent is in the process of performing an explicit writeback of data from the same address.

SUMMARY

Embodiments of the present invention provide for a transaction management method for a processing agent in which the agent receives a request for data identified by an address. The agent then determines whether it has in store a pending write transaction to the address and, if so, sets a transaction length associated with the pending write transaction to zero.

BRIEF DESCRIPTION OF THE DRAWINGS

FIG. 3 is a flow diagram illustrating a method of operation of an implicit writeback in accordance with an embodiment of the present invention.

DETAILED DESCRIPTION

The present invention provides for a system and method for allowing explicit writebacks to continue during snoop phases in a multiple agent system. Upon each incoming snoop request, the agent determines if the address of the snoop request matches an address of data within the agent. If there is a match, the agent copies the most recent data, changes the state of the data within the agent to unmodified, and transmits the copied data to the requesting agent and the main memory unit. If the data resides in the external transaction queue, the agent also changes the length of the data to zero. Additionally, prior to issuing each explicit writeback on the communications bus, an agent determines if the address of the explicit writeback and any incoming snoop requests are the same. If there is a match, the agent changes the data length of the explicit writeback to zero before transmitting the explicit writeback to the main memory unit.

Figure 1:
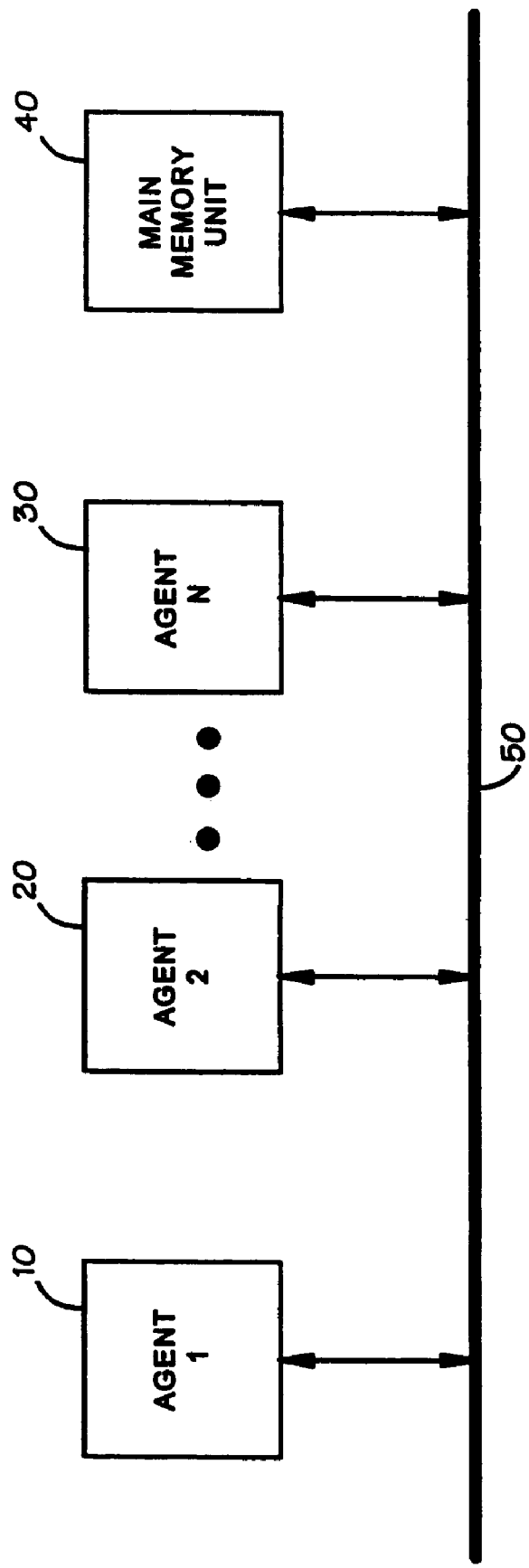
FIG. 1 is a block diagram of a multiple agent system sharing a main memory unit over a communications bus in accordance with an embodiment of the present invention.
Figure 2A:
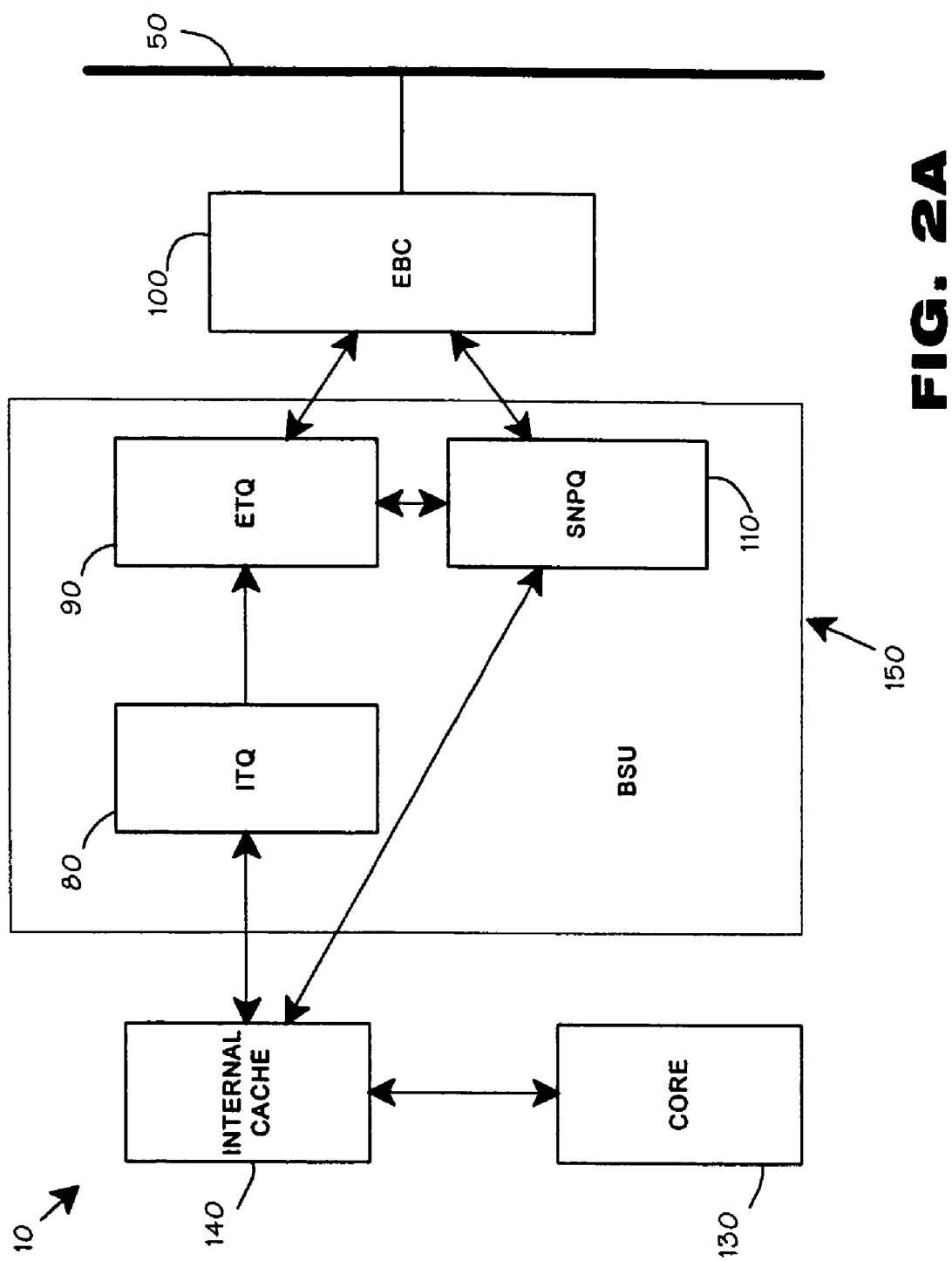
FIG. 2A is a more detailed block diagram of one of the agents in FIG. 1 in accordance with an embodiment of the present invention.
Figure 2B:
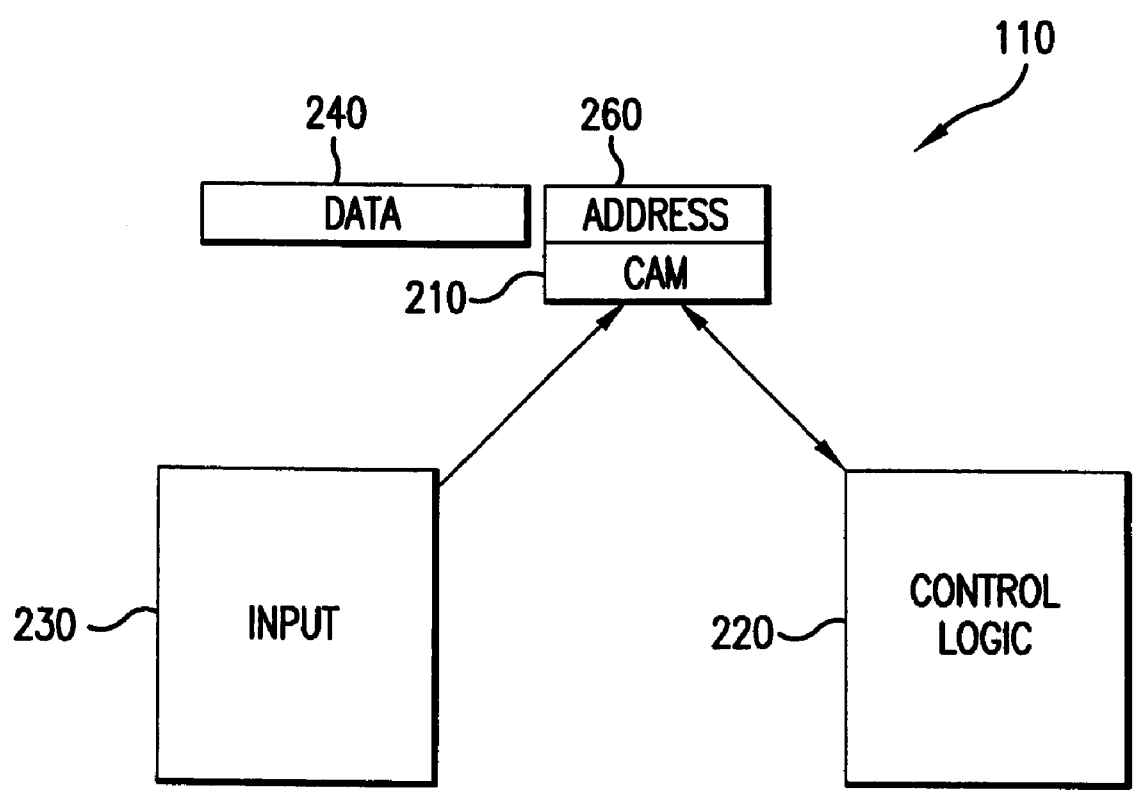
FIG. 2B is a still more detailed block diagram of the snoop queue component of one of the agents in FIG. 1 in accordance with an embodiment of the present invention.

In an embodiment, the principles of the present invention may be applied in an agent 10 shown in FIG. 2A and FIG. 2B. As shown in FIG. 2A, the agent 10 may include a bus sequencing unit ("BSU") 150, a core 130 and an internal cache 140. The BSU may include an internal transaction queue ("ITQ") 80, an external transaction queue ("ETQ") 90, and a snoop queue ("SNPQ") 110. An external bus controller ("EBC") 100 may interface the BSU 150 to the communications bus 50.

The internal cache 140 stores data in a plurality of cache entries. It possesses logic responsive to a data request to determine whether the internal cache 140 stores a valid copy of requested data and, if so, it furnishes the requested data in response thereto.

The ITQ 80 receives and stores data requests issued by the agent core 130. It coordinates with the internal cache 140 to determine if the requested data "hits" (can be furnished by) the internal cache 140. If not, if a data request "misses" the internal cache 140, the ITQ 80 forwards the data request to the ETQ 90. The ITQ 80 also coordinates with the internal cache 140 to process explicit writebacks by passing along data with a modified state to the ETQ 90 for eventual updating of the main memory unit 40. Such a process may be accomplished by eviction, wherein data with a modified state is evicted from a lower level of a cache to higher level of a cache. Such an eviction may occur when the lower level of cache is full and space is required for more recent cache entries.

The ETQ 90 interprets data requests and generates external bus transactions to fulfill them. The ETQ 90 is populated by several queue entries. The ETQ 90 manages the agent's transactions as they progress on the external bus 50.

The snoop queue 110 causes cache coherency checks to be performed within the agent. Typically, in response to a new bus transaction issued by another agent, the snoop queue 110 causes the generation of snoop probes to various caches within the agent (such as internal cache 140) and to the ITQ 80 and ETQ 90. It receives responses to the snoop probes and generates snoop responses therefrom. If necessary, the snoop queue 110 manages implicit writebacks of modified data from the agent.

The external bus controller 100 drives signals on the external bus as commanded by the ETQ 90 and snoop queue 110.

As shown in FIG. 2B, the snoop queue 110 may include a plurality of entries for the storage of data that may include an input 230, a data field 240 and an address field 260. The data in the snoop queue may be associated with the transactions of the snoop queue 110. Various attributes in the snoop queue may be associated with the corresponding data 240 and may contain information about such data including, for example, the data's address 260 in the main memory unit 40.

The control logic 220 may, among other tasks, identify particular data 240 based on the address field 260 of the data. The control logic 220 may obtain this information using content addressable logic ("CAM") 210 in conjunction with the address field 260 and the input 230 from other devices, using a method known in the art. The control logic 220 may also alter the length field of the chosen data to zero in the ETQ 90.

Figure 4:
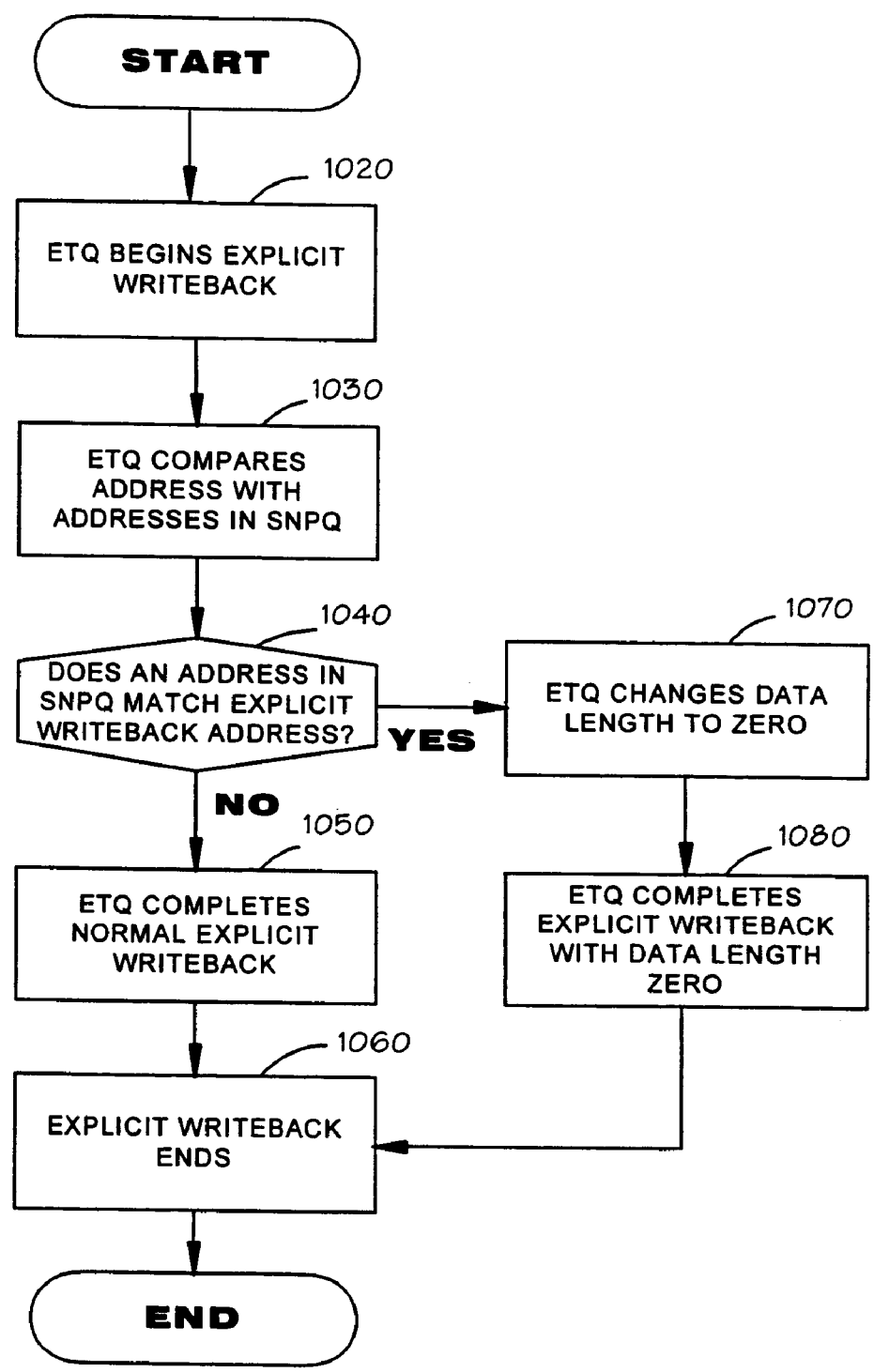
FIG. 4 is a flow diagram illustrating a method of operation of an explicit writeback in accordance with an embodiment of the present invention.

In an embodiment of the present invention, the agent 10 may operate in accordance with the method of FIG. 3 and FIG. 4 to allow explicit writebacks to proceed during implicit writeback phases while maintaining cache coherency in the event that an explicit writeback is directed to the same address as an incoming snoop phase.

As shown in FIG. 3 illustrating an embodiment of the present invention, the agent 10 may perform "snoop phases" when another agent 20, 30 requests data at a specific address from the main memory unit 40 over the communications bus 50 (Step 2010). The snoop queue 110 may observe transactions on the communications bus 50 via the external bus controller 100. The snoop queue 110 may issue snoop probes to the various caches and transaction queues within the agent 10. Control circuitry within the caches and transaction queues return a hit flag and a copy of data if the cache or transaction queue stores modified data (Step 2020). If the snoop queue 110 finds that there is no modified data with the same address as that of the request (Step 2030), the snoop queue 110 issues a "miss" or "clean" snoop response on the external bus 50 (Step 2080). The snoop phase then ends for the agent 10 (Step 2090).

If the snoop queue 110 finds that there is an address match in a line containing modified data within the agent 10 (Step 203), the snoop queue 110 proceeds to perform an implicit writeback. Among other operations, the snoop queue copies the data from the appropriate location in the agent 10 if the data is not in the ITQ 80 or ETQ 90 (Step 2040), changes the state of the data in the agent 10 to unmodified (Step 2050), and changes the data length attribute of the data in the agent 10 to a length of zero if the data is in the ITQ 80 or the ETQ 90 (Step 2060). The snoop queue 110 then reports that a match occurred to the requesting agent 20, 30 over the communications bus 50 (Step 2070) and the snoop phase ends for the agent 10 (Step 2110). Such a transmission may use the external bus controller 100 to communicate with the other agent 20, 30 and the main memory unit 40 via the communications bus 50.

To insure cache coherency, the snoop queue 110 changes the state of the data in the agent 10 to an unmodified state (Step 2050) and changes the length of the data in the agent 10 to zero if the data is in the ITQ 80 or the ETQ 90 (Step 2060). These measures are necessary if this data is in a section of the agent 10, for example in the ETQ 90, where the data is awaiting to be transmitted to the communications bus 50 via an explicit writeback. It is advantageous for the snoop queue 110 to alter the data in such a way to nullify any effect of such a potential explicit writeback. Because the main memory unit 40 and the other agents 20, 30 will ignore any explicit writebacks with a data length of zero, altering the data length attribute of the data to zero will nullify the effect of an explicit writeback of this data. One advantage of altering the data length to zero is that the ETQ 90 will process this nullified explicit writeback in the same manner as all other transactions. There is no need as in the prior art system to impede the orderly processing of explicit writebacks in order to maintain cache coherency.

As previously discussed, in order to maintain cache coherency while allowing explicit writebacks to continue during snoop phases, it is necessary to nullify the effect of those explicit writebacks of data with the same address as any incoming, but not yet processed, snoop requests. As shown in FIG.4 illustrating an embodiment of the present invention to accomplish this task, the ETQ 90 begins an explicit writeback over the communications bus 50 (Step 1020). This stage of the explicit writeback may include, for example, transmitting information regarding the type of bus operation that is to performed, but does not include transmitting the data length of the explicit writeback. At the same time or thereafter, but before the data length of the explicit writeback is transmitted to the communications bus, the ETQ 90 determines if the address of the explicit writeback matches the address of an incoming snoop request (Step 1030). This may occur by, for example, the ETQ 90 interfacing with the control logic 220 of the snoop queue 110 via the input 230. The control logic 220 may then determine, possibly by use of content addressable logic, if any incoming snoop requests in the entries of the snoop queue 110 are for the same address as the explicit writeback.

If the address of the explicit writeback does not match the address of an incoming snoop request (Step 1040), there is no cache coherency problem and the ETQ 90 completes the explicit writeback in the normal fashion (Steps 1050, 1060). If, however, the address of the explicit writeback matches the address of an incoming snoop request, (Step 1040) the ETQ 90 changes the data length attribute of the data to zero (Step 1070) and then completes the explicit writeback with this altered parameter (Steps 1080, 1060). This will be effective in nullifying the effect of this explicit writeback because the main memory unit 40 and the other agents 20, 30 will ignore any explicit writebacks with a data length of zero. This nullified explicit writeback, however, may proceed in its normal fashion along with other, proper, explicit writebacks. Moreover, the ETQ 90 does not alter the state of the data from its modified state. Accordingly, when the snoop queue 110 later issues the matching snoop request, the snoop queue 110 will find the modified data with the matching address in the ETQ 90 and will perform an implicit writeback using the most recently modified copy of data to update the main memory unit 40, as depicted in FIG. 3.

Accordingly, the present invention allows an agent to continue performing explicit writebacks while concurrently processing snoop requests. The effect of explicit writebacks that would otherwise violate cache coherency is nullified by altering the data length attribute to zero of the offending explicit writeback. It will be appreciated by those skilled in the art that the specific embodiments disclosed above may be readily utilized as a basis for modifying or designing other methods and techniques for carrying out the same purposes of the present invention. It should also be realized by those skilled in the art that such equivalent constructions do not depart from the spirit and scope of the invention as set forth in the following claims.

We claim:

1. A transaction management method for a processing agent, comprising:

receiving a request for data, the data identified by an address;

determining whether there is a pending write transaction to the address;

if so, setting a transaction length associated with the pending write transaction to zero.

2. The method of claim 1, further comprising setting a state associated with the pending write transaction to unmodified.

3. The method of claim 2, further comprising posting the pending write transaction.

4. The method of claim 3, further comprising posting the zero transaction length associated with the pending write transaction.

5. The method of claim 4, further comprising posting a second write transaction identified by the same address as the pending write transaction.

6. The method of claim 5, further comprising posting a nonzero transaction length associated with the second write transaction.

7. The method of claim 3, wherein posting the pending write transaction includes the use of an external bus controller.

8. The method of claim 1, wherein determining whether there is a pending write transaction to the address includes the use of a cache.

9. The method of claim 1, wherein receiving a request for data includes the use of an agent core.

10. A transaction management method for a processing agent, comprising:

prior to posting the length of a write transaction associated with an address, determining whether a request associated with the same address is pending;

if so, setting the transaction length of the write transaction to zero and posting the transaction length information.

11. The method of claim 10, further comprising posting the write transaction.

12. The method of claim 10, wherein determining whether a request associated with the same address is pending includes the use of content addressable logic.

13. The method of claim 10, wherein posting the transaction length information includes the use of an external bus controller.

14. An agent, comprising:

a transaction queue to store by a plurality of queue entries having fields associated with the address and state of transactions;

content addressable logic in association with address fields of the queue entries to set a transaction length field to zero.

15. The agent of claim 14, wherein the transaction queue is adapted to setting the state associated with the write transaction to unmodified.

* * * * *